United States Patent [19]

Belart

[11] 4,050,748
[45] Sept. 27, 1977

[54] BRAKING SYSTEM HAVING ANTI-SKID CONTROL

[75] Inventor: Juan Belart, Walldorf, Germany

[73] Assignee: ITT Industries, Incorporated, New York, N.Y.

[21] Appl. No.: 682,867

[22] Filed: May 3, 1976

[30] Foreign Application Priority Data

Aug. 23, 1976 Germany .............................. 2519835

[51] Int. Cl.² ................................................ B60T 8/02
[52] U.S. Cl. ..................................... 303/114; 303/115; 303/119
[58] Field of Search ............. 303/6 R, 6 C, 6 A, 6 M, 303/10, 92, 63, 100, 113, 114, 115, 116, 117, 119; 188/181, 345

[56] References Cited

U.S. PATENT DOCUMENTS

| | | | |
|---|---|---|---|
| 3,813,130 | 5/1974 | Inada | 303/115 |
| 3,877,759 | 4/1975 | Sekiguchi et al. | 303/115 |

FOREIGN PATENT DOCUMENTS

| | | | |
|---|---|---|---|
| 2,450,874 | 5/1975 | Germany | 303/119 |

Primary Examiner—Trygve M. Blix
Assistant Examiner—Douglas C. Butler
Attorney, Agent, or Firm—John T. O'Halloran; Thomas M. Marshall

[57] ABSTRACT

A braking system provides for a master cylinder of the tandem or split type connected through a control pressure device to the wheel cylinders of brakes for at least one of the wheels which includes a modulating valve controlled by the master cylinder pressure which provides an auxiliary pressure obtained from a source of brake fluid under pressure. The modulating valve feeds through a control valve which is under the control of an electronic anti-skid device. Thus, the modulating valve controlled by the master cylinder's pressure through the control valve effects the operation of the pressure control valve and applies the brakes of the vehicle.

10 Claims, 1 Drawing Figure

BRAKING SYSTEM HAVING ANTI-SKID CONTROL

BACKGROUND OF THE INVENTION

1. Field of the Invention

Anti-skid control brake systems and safety devices used therein.

2. Prior Art

A braking system of the similar type described in this application is disclosed in German unexamined patent application DT-OS No. 1,947,012. In the system disclosed therein there is a braking system with an anti-skid control wherein a pressure control device is connected to the connecting lines in a position between the static master cylinder and at least one wheel cylinder. The pressure control device has a wheel cylinder pressure applied piston having a specific surface which is subjected to an auxiliary pressure from a brake fluid under pressure source through a valve which is able to block a connection between the pressure source and the pressure control device as well as to open a return connection. In addition, the device has a valve member which is operable by the wheel cylinder pressure applied piston which is able to block the connection between the master cylinder and the wheel cylinder.

In the device as described in the aforementioned German unexamined application, the piston is designed as a floating piston which in normal circumstances is kept in one of its end positions by means of the auxiliary pressure acting on its bottom side. In that end position the floating piston simultaneously keeps a check valve open which is blocking in the direction of the wheel cylinder. At the on set of a control cycle, the auxiliary pressure acting on the bottom side of the floating piston is reduced by the valve by way of discharging the pressure medium through return lines to a reservoir, by means of which the floating piston is brought into a floating position wherein the check valve is closed. Thus starting from the master cylinder the device prevents any further pressure build up in the wheel cylinders. In this situation the pressure prevailing in the wheel cylinders will only be a determined by the auxiliary pressure acting on the bottom side of the floating piston. Leaving the frictional forces on the floating piston aside, the effective braking pressure will thus behave as if the wheel cylinders were directly communicating with the valve during the control cycle. In the normal situation, that is to say, when there is no control cycle the floating piston is kept in its end position in which position it simultaneously keeps the check valve open. Accordingly, when no control cycle is in operation the auxiliary pressure acting on the floating piston must always exceed the highest braking pressure possible in order to keep the floating piston in its end position. This implies that any control cycle will always start at this high pressure level even if, due to outside circumstances, the limit with regard to wheel lockup is reached at a considerably lower braking pressure. Accordingly the start of the pressure reduction caused by the valve will not come into full operation until some time has passed, with the result that a braking system of that general type is characterized by unduly long idle times especially where low frictional values are involved between the road surface and the wheel contact surface.

Inasmuch as in all such braking systems a normal application of the brakes must be provided for even upon the failure of the auxiliary pressure, the prior art braking system is also provided with an emergency spring. Upon the failure of the auxiliary pressure the spring will act on the floating piston so as to keep it in its end position. If auxiliary pressure is available the emergency spring will be depressed by a clamping piston so as to allow the floating piston to move free of the spring. The design rating of the emergency spring must be very high since, even in the noncompressed state, it must be able to keep the piston in its end position against the highest braking pressure possible which acts on the piston. This means that the assembly in the pressure control device is under considerable tension. Another disdvantage of this prior art braking system consists of the fact that the piston is under permanent action of the auxiliary pressure if the braking system is intact. Thus the seal provided at the piston will also be permanently under pressure. Additionally due to the rarely occurring control operations the piston will remain unmoved for long periods of time. This means that there is a special danger for the seal. If there is damage to the seal the result will be a failure of the braking system at least in the braking circuit which is connected to the respective pressure control device.

A further known disadvantage of the prior art braking system results from the fact that in each case towards the end of any control cycle the control operations will have an effect on the master cylinder and hence can be felt on the brake pedal. This is due to the fact that during the braking operation the brake fluid under pressure available in the wheel cylinder is heated and is thus subjected to an increase in volume. Consequently when the piston is reaching its end position at the termination of any control cycle a small amount of the fluid under pressure is moved back into the master cylinder where it will lead to a pressure peak.

SUMMARY OF THE INVENTION

It is the object of this invention to design a braking system of the type mentioned above which insures a normal braking operation without any anti-skid control upon the failure of the auxiliary fluid pressure force, without any special means, such as emergency springs and the like, having to become effective first in the pressure control device. On the other hand if anti-skid control does take place it will be required that there be a direct communication between the wheel cylinder and the valve during the control cycle, the elements serving the purpose of anti-skid control being completely balanced when braking is not occurring. Furthermore anti-skid control must always be initiated at the level of the pressure applied by the driver to the master cylinder.

The object of this invention is solved by providing, in the connection between the auxiliary brake fluid pressure source and the pressure control valve, a modulating valve which is controlled by the master cylinder pressure and through which auxiliary pressure can be obtained from the pressure medium source in correspondence with the master cylinder pressure. In the device of this invention a piston, in the pressure control valve, is a stepped piston which includes a third surface which is directly subjected to the auxiliary pressure and which is opposed to first and second surfaces. In addition a valve passage can be opened by the valve member after the connection to the master cylinder has been blocked. The valve passage leads from a chamber in front of the first surface to a chamber in front of the second surface. By means of the modulating valve it is made possible to supply the auxiliary pressure to the pressure control device only when the brake is operated. Thus the pressure control device is completely balanced when the brake is not operated. If a control cycle of the anti-skid electronic system is taking place the control will always be effected starting from the level of the braking pressure of the master cylinder, since the auxiliary pressure equals the braking pressure. Thus, even if the limit with regard to wheel lock up is reached at relatively low pressures, there will be no delay after the response of the valve. During the control cycle the wheel cylinder communicates directly with the valve whereby any changes in volume caused by the heating up of the brake fluid will have no effect on the master cylinder when the control cycle is terminated. This direct communication also prevents the forming of a hysterisis during the control cycle.

In the braking system according to this invention there is provided that the first operated on surface of the pressure control device corresponds to the end of the smaller diameter of a stepped piston while a second operated on surface is formed by the annular surface of the stepped piston. A valve passage is located in the stepped piston and a valve member is arranged axially movable within the valve passage. A first locking element of the valve member projects to the exterior of the first operated on surface and is able to block a pressure medium communication designed as a valve seat and connected with the master cylinder. Furthermore, it provides a valve seat which is associated with the valve passage for the blocking of the valve passage to be accomplished by a second locking element of the valve member. The valve member is subjected to the force of a closing spring in the closing direction. Accordingly, a particular compact and inexpensive embodiment of the pressure control device is achieved which also ensures a simple way to ensure that the connection to the master cylinder is always blocked first, before the connection between the wheel cylinder and the pressure control valve will be opened.

Furthermore, the device provides that a stepped piston between the chamber connected to the wheel cylinder and the annular chamber connected with the control pressure valve is sealed against its valve housing by means of a collar which at the same time, functions as a check valve which is blocking in the direction of the annular chamber. This achieves a structure in which the valve passage being blocked and the pressure medium connection to the master cylinder continuing to be blocked — the fluid under pressure can continue to flow from the annular chamber into the chamber connected to the wheel cylinder so that no pressure variation will occur when the piston in the wheel cylinder is moving back.

In a particularly advantageous embodiment it is provided that the valve between the pressure control device and the modulating valve be a proportional valve which will reduce the auxiliary pressure supplied to the pressure control device by a value which is determined by a control signal. This result has the advantage that the rates of pressure build up and reduction during the control cycle are not invariably determined by fixed cross sections but instead is adaptable to the respective road surface conditions by means of the corresponding control of the proportional valve. An especially inexpensive embodiment of the modulating valve consists of having a control slide which is arranged in a bore and has two operating surfaces which are opposite to each other. The first operating surface defines a control chamber communicating with the master cylinder while the second operating surface defines a reaction chamber in communication with a proportioning valve. Furthermore the bore has a lateral connection which communicates with the fluid under pressure source and a second connection which communicates with the return line, those connections each being blocked or communicating with the reaction chamber depending upon the position of the valve slide.

In a further especially advantageous embodiment, provisions are made to subdivide the control chamber of the modulating valve into two chambers by means of a floating piston, the diameter of which corresponds to the diameter of the surface on the valve slide which faces the control chamber and wherein each of the chambers communicate with each of the circuits of the master cylinder at the same time, it being understood that the master cylinder is designed in accordance with the principles of dual circuitry. Furthermore, the pressure control devices are disposed each in the immediate vicinity of the wheel cylinders. If in such an embodiment a leakage occurs in one of the brake lines between the pressure control device and the master cylinder or if either circuit of the master cylinder becomes defective, because of the auxiliary pressure source the build up of brake pressure will continue to be safeguarded within the wheel cylinders communicating with this circuit. Accordingly, such a failure as described in the braking system will not result in any substantial detriment to the braking capacity of the vehicle.

Further advantages and features of the braking system of this invention can be determined from the description of a specific embodiment thereof in conjunction with the accompanying drawings.

DESCRIPTION OF THE PREFERRED EMBODIMENTS

Figure 1:
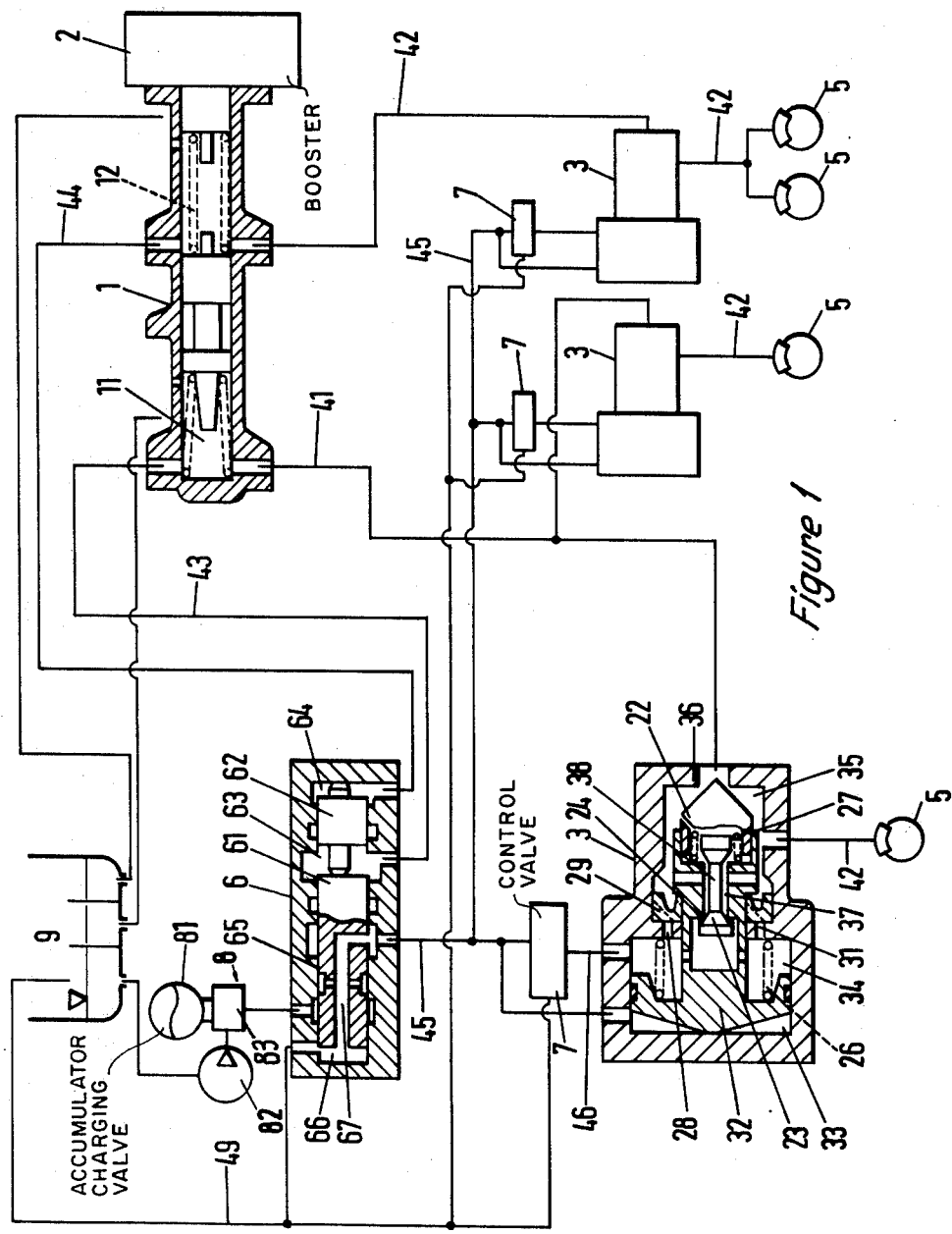
FIG. 1 is a schematic braking system in accordance with the principles of this invention illustrating in some detail the representative master cylinder, a modulating valve having an auxiliary pressure source and a pressure control valve.

In the device illustrated schematically in FIG. 1, there is a conventionally designed dual circuit master cylinder 1 associated with a pneumatic brake booster 2 interposed between the master cylinder 1, the actuation rod for the brake booster 2 which is connected to a braking pedal (not shown). In the customary manner the vehicle operator actuates master cylinder 1 by depressing the brake pedal which, through its actuation rod operates the brake booster 2 which in turn causes the pressurization of fluid from a reservoir 9 in the two chambers 11 and 12 of master cylinder 1. The pressure chambers 11 and 12 of master cylinder 1 are connected with wheel cylinders 5 through brake lines 41, pressure control devices 3 and brake lines 42. At the same time the pressure chambers 11 and 12 are in communication with a modulating valve 6 through connecting lines 43 and 44. The modulating valve 6 is also connected to a pressure medium source 8 which includes a pump 82 and accumulator 81 and an accumulator charging valve 83. A connecting line 45 leads from the pressure modulating valve 6 to the pressure control device 3 through a valve 7 and connecting line 46. The braking system illustrated is provided with a central pressure medium storage reservoir 9 in which the pressure medium or brake fluid is stored to be utilized both in the pressure medium source and the master cylinder 1 through connecting lines as illustrated.

The modulating valve 6 consists of a control slide 61 positioned in bore 65 and a floating piston 62 also positioned in bore 65. Between the control slide 61 and the floating piston 62 there is a chamber 63 defined which communicates with the master cylinder's pressure chamber 11 through line 43. At the closed end of bore 65 a chamber 64 defined between floating piston 62, which chamber 64 is in communication with the pressure chamber 12 of master cylinder 1 through line 44. On the side of the control slide 61 which is opposite to chamber 63, a chamber 66 is defined which, in the rest position, communicates with the storage reservoir 9 via return line 49. In the control slide 61, ducts 67 are provided through which the chamber 66 is always in communication with line 45. Furthermore, the chamber 66 can be connected to the pressure medium source 8 through ducts 67 after the connection of the chamber 66 to return line 49 has been blocked.

The position of the modulating valve 6 as illustrated in FIG. 1 is the rest position. This rest position will be assumed by the control slide 61 if the chamber 63 and 64 are not pressurized. In this rest position the chamber 66 communicates with the return line 49 through the connection opened by the valve slide so that line 45 will also be in communication with return line 49. In the rest position the connection between the chamber 66 and the pressure medium source 8 which also is in communication with duct 67 is closed by control slide 61. Upon the application of pressure to the control slide 61 through chamber 63, or by means of the floating piston 62 through the chamber 64 in the device illustrated in the drawing, the control slide 61 will be moved to the left. Thus the connection of the chamber 66 with the return line 49 is blocked while after a further slide displacement the connection with the pressure medium source 8 is opened. In the chamber 66 and hence in the line 45 thus a pressure is supplied which corresponds to the pressure prevailing in chamber 63 or in chamber 64. If such a pressure is obtained in the pressure chamber 66 the control slide 61 will adopt a floting position in which both the connections to the return line 49 and to the pressure medium source 8 are blocked. Upon pressure changes in the chamber 63 or in the chamber 64 the control slide 61 will immediately be thrown out of balance until the pressure in chamber 66 has been readapted to the changed conditions. If the pressure in chamber 63 and the chamber 64 equals the pressure of the pressure chambers 11 and 12 of master cylinder 1 a pressure will thus always be supplied through the modulating valve 6 into the line 45 which will correspond to the pressure of master cylinder 1.

The pressure control device 3 includes a stepped piston 32 guided displaceably in the sealed manner in stepped bore 31 and defines pressure medium chambers 33, 34 and 35. The pressure chamber 33 which is opposite the larger end of stepped piston 32 directly communicates with the line 45. The chamber 34 is formed as an annular chamber due to the steps of the stepped bore 41 and of the stepped piston 32 and communicates with the valve 7 via line 46. The chamber 35 communicates with a wheel cylinder 5 via connecting line 42. Furthermore chamber 35 has a pressure medium connection 36 whose end is designed as a valve seat and is in communication with line 41. The pressure medium connection portion 36 is positioned in chamber 35 so as to be in coaxial alignment with the stepped piston 32.

A pressure medium passage 37 is formed in stepped piston 32 to provide for a connection between chambers 34 and 35. Positioned in the valve passage 37 is a valve member 38 arranged so as to be coaxially movable with respect to the stepped piston 32. The valve member 38 has a first blocking element 22 projecting into chamber 35 and a second blocking element 23 located in the valve passage 37. The blocking element 22 enables the pressure medium connection 36 to be blocked at its valve seat while the second blocking element 23 enables blocking of the valve passage 37 at the valve seat 24. The valve member 38 is operated on with a force provided by a spring 27 operating in the direction of valve seat 24 and the pressure medium connection 36. In the annular chamber 34 a return spring 26 is arranged which acts, in the device illustrated in the drawings, in the leftward direction.

The pressure control device 3 operates as follows: If the same pressure is present in chambers 33, 34 and 35 the stepped piston 32 will remain in the position shown in the drawing due to the action of the return spring 26, the annular chamber 34 and chamber 35 being separated from each other due to the blocking element 23 which is seated on its valve seat 24. If the pressure in annular chamber 34, however, is being reduced, the stepped piston 32 will no longer be pressure compensated and it will move to the right, in the device shown in the drawing, as a result of which the blocking element 22 will block the pressure medium connection 36 at the valve seat formed thereon. Due to further displacement of the stepped piston 32 the spring 26 will be compressed and the blocking element 23 will lift off of valve seat 24 as a result of which the annular chamber 34 will communicate with chamber 35 through valve passage 37. Thus the pressure in chamber 35 will be reduced in conjunction with the pressure in the annular chamber 34. Pressure in annular chamber 34 and chamber 35 being reincreased up to the level prevailing in chamber 33 by means of a subsequent supply of fluid under pressure into the annular chamber 34. The stepped piston 32 will be displaced by the action of return spring 26 to reposition itself in the position illustrated in the drawing. In doing so, the first blocking element 23 is returned to its valve seat 24 by means of valve spring 27 before the blocking element 22 will lift off its valve seat at the connection 36. If, for any reason, no fluid under pressure is supplied to chambers 33 and 34 the stepped piston 32 will remain in the position shown in the drawing due to the action of the pressure prevailing in chamber 35. In this situation the blocking element 23 is kept on its valve seat 24 by means of valve spring 27 so that a discharge of pressure medium or braking fluid from the chamber 35 into the annular chamber 34 is prevented. On the other hand in the event of a pressure drop in chamber 35 as compared with annular chamber 34 with the blocking element still being seated on its valve seat 24 brake fluid will be passed from the annular chamber 34 through the bore 28 along the sealing collar 29 into chamber 35. In this arrangement the sealing collar 29 functions as a check valve which is blocking in the direction of the annular chamber 34. Such a condition may arise during the short switching phase of the pressure controlling device 3 in which the stepped piston 32 is temporarily in a mid-position.

In the braking system of this invention a normal three way, two position directional control valve or even a three-way, three-position directional control valve with a mid-position could be used as the valve 7. In the rest position of the valve 7, the lines 45 and 46 are connected to each other while the return line 49 is blocked. A three-way, three-position directional control valve may be used in which, in the mid-position connecting lines 45 and 46 will be separated from each other while at the same time the return line 49 will be blocked. In the third position of such a valve the line 46 is connected with return line 49 while the line 45 is blocked. Preferably, a proportional valve may be used as valve 7 which in dependence on its control signal will directly effect a preselected pressure change. Such a proportional valve would be particularly advantageous if, in the electronic circuit (used in anti-skid control systems and not illustrated in the drawing), a control signal is generated which preselects or predetermines the degree of a reduction required in braking pressure. In this case such a proportional valve will be connected with the lines 45 and 46 and with return line 49 so as to reduce the pressure prevailing in the line 46 as compared with the pressure supplied to the line 45 by the amount preselected by the control signal. To this end if necessary the proportional valve will effect a discharge of braking fluid from the line 46 into the return line 49 or initiate a further delivery of brake fluid under pressure from the line 45 into the line 46.

Taking into account the mode of operation of the individual described components, the overall mode of operation of the brake system of this invention is as follows:

Upon the actuation of the master cylinder in the known manner by the vehicle operator pressure and build up in the brake fluid in pressure chambers 11 and 12 which on the one hand is directed to the wheel cylinders via lines 41 and 42 through the chamber 35 of the presure control device 3. At the same time brake fluid under pressure from chambers 11 and 12 is passed into the chambers 63 and 64 of the modulating valve 6, the result of which is that modulating valve 6 regulates the application of an auxiliary supply of pressure, depending on the pressure build-up in pressure chambers 11 and 12, from the pressure medium source 8 into the line 45. Thus the auxiliary pressure will directly be supplied to chamber 33 and communicate through the open valve 7 to the line 46 leading into annular chamber 34, if no anti-skid control signal is present or is operating. Thus there is the same pressure in chambers 33, 34 and 35 of the pressure control device 3 so that the stepped piston 32 is pressure compensated and remains in the position shown in the drawing. In this case the application of fluid under pressure to the wheel cylinders 5 is thus direct, starting from the pressure chambers 11 and 12 of the master cylinder 1.

If there is a condition in which there is a danger of lock-up of one or each of the wheels, an electronic circuit (not shown) will produce a control signal which will influence the valve 7 so as to interrupt communication between the brake lines 45 and 46 and will discharge the brake fluid into the return line 49 for the purpose of pressure reduction in the annular chamber 34. This of course means that the stepped piston 32 of pressure control device 3 will no longer be pressure compensated and as previously described will be displaced to the right according to the drawing. As a result the chamber 35 connected with the wheel cylinder 5 communicates with the annular chamber 34 while the connection to master cylinder 1 is blocked. The pressure reduction in annular chamber 34 is controlled by the valve 7 and will thus be effective in the chamber 35 and hence in the connected wheel cylinder 5.

Once the danger of a lock-up of the wheel has passed, a new control signal will cause the valve 7 to control the application of brake fluid under pressure from line 45 which comes from the modulting valve 6 to the input line 46. Thus the pressure will be reincreased in annular chamber 34, in chamber 35 connected with the annular chamber 34 and in the wheel cylinder. If, in doing so a braking pressure is again achieved which is predetermined by the driver and the master cylinder, the piston 32 of the pressure control device 3 will be pressure compensated again and displaced by the return spring 26 to the left in the device illustrated in the drawing. Then the connection between the annular chamber 34 and the chamber 35 will again be interrupted and the wheel cylinder 5 will be reconnected to the master cylinder 1 and operable by said master cylinder in the normal manner.

Upon failure of the pressure source 8 the modulating valve 6 will be unable to feed any auxiliary pressure into the line 45. Thus, also the chamber 33 and the annular chamber 34 of the pressure control device 3 will remain depressurized, independent of any possible switching operations of the valve 7. The stepped piston 32 of pressure control device 3 will thus remain in the position shown in the drawing due to the action of the braking fluid under pressure in chamber 35, the blocking element 23 of valve member 38 being kept by means of spring 27 in the closed position shown in the drawing. In this situation the entire braking system can be operated in an absolutely normal way, that is to say, as if no anti-skid control device were present.

It is further conceivable that a leakage would occur in one of the lines 41. Keeping this in mind, and considering the event in which the leaking line is line 41 connected to the pressure chamber 11 of master cylinder 1, the following mode of operation results: In pressure chamber 11 which is thus in a failed condition, no pressure build up is possible in this assumed case. However, the wheel cylinders 5 communication with the pressure chamber 12 will be operated normally. On the other hand the pressure build up in chamber 12 also has the effect that the modulating valve 6 will feed an auxiliary pressure, which corresponds to the pressure in pressure chamber 12 into the line 45. The auxiliary pressure enters the chamber 33 and the annular chamber 34 of the pressure of the pressure control device 3, effecting a connection to the wheel cylinders which are connected to the pressure chamber 11 of the master cylinder 1. Since no pressure has been built up in the chamber 35, the stepped piston 32 of such a pressure control device 3 will therefore at first not be pressure-compensated. According to the embodiment illustrated in the drawing, the piston 32 will therefore be displaced to the right until the blocking element 22 blocks the connection 36. In this action the effect of bore 28 and of the sealing collar 29 may at first be ignored as the check valve formed by them provides an admittedly small yet sufficient resistance in order to ensure a pressure build-up in chamber 33 which will be sufficient to displace the stepped piston against the return spring 26. However, if the blocking element 22 abuts its valve seat, the action of the valve spring 27 must be overcome in addition. Consequently a considerably higher pressure is needed in chamber 33. Therefore, from that moment onward the pressure in annular chamber 34 will be sufficient to overcome the resistance of the check valve formed by the bore 28 and the sealing collar 29 and to allow fluid under pressure to flow into the chamber 35. The fluid, that flows into the chamber 35 and builds up a pressure there will be slightly below the braking pressure applied by the driver to the pressure chamber 12 of the master cylinder 1. Thus, the brake pressure in chamber 35 will operate the wheel cylinders 5 associated with pressure chamber 11 just as though that portion of the system had not failed. Accordingly, if there is a defect in the braking system as illustrated in the drawing, a true emergency operation of the wheel cylinders 5 associated with the braking system is possible. In terms of efficiency it is unlikely that in such an emergency operation the driver would be able to differentiate the emergency operating condition from the normal condition. Accordingly, the pressure control device in the system of this invention provides a safety device in the event of leakage in addition to it functioning as an element in the anti-skid control braking system of this invention.

While the device of this invention has been described and illustrated in connection with a specific embodiment, it will be appreciated that changes may be made which do not depart from the spirit and scope of the claims.

What is claimed is:

1. A braking system having anti-skid control wherein a pressure control device is interposed in at least one line forming a connection between a master cylinder and at least one wheel cylinder, said pressure control device including a housing carrying a piston having operating surfaces which are acted on by the wheel cylinder pressure and by an auxiliary pressure from a pressure medium source through a modulating valve, said modulating valve being able to block a connection between the pressure medium source and the pressure control device and to open a return connection, said pressure control device also including a valve member therein operable by said piston which is capable of blocking said connection between said master cylinder and said wheel cylinder, including:
   a connecting line forming a connection between said pressure medium source and said modulating valve,
   said modulating valve being positioned in said connection between said pressure medium source and said pressure control device and including means for controlling the output pressure of the auxiliary pressure which may be obtained from said pressure medium source so as to correspond to the pressure in said master cylinder;
   said piston in said pressure control device being a stepped piston having first, second and third operating surfaces wherein said third operating surface is directly operated on by said auxiliary pressure from said modulating valve which is opposed by the master cylinder and wheel cylinder pressures acting respectively on said first and second operating surfaces, and having a valve passage formed in said piston capable of being opened by said valve member positioned in said piston after said connection to said master cylinder has been blocked, said valve passage forming a connecting passage leading from a chamber in said housing in front of said second operating surface.

2. A braking system as set forth in claim 1 wherein control valve means are positioned between said pressure control device and said modulating valve, said control valve means being a proportional valve means which reduces the auxiliary pressure supplied to said pressure controlled device by a value determined by an anti-skid control signal.

3. A braking system as set forth in claim 1 wherein said modulating valve includes a control slide which is displacably arranged in a bore formed in a housing and has two operating surfaces opposite each other, the first of said operating surfaces defining a control chamber communicating with the master cylinder and wherein said second operating surface defines a reaction chamber communicating with said pressure medium source and having a second radial connection which communicates with a return line, each of said connections being blocked or communicating with said reaction chamber depending upon the position of said valve slide.

4. The braking system as set forth in claim 1 wherein, in the said connection between the master cylinder and each of a plurality of wheel cylinders, comprising a plurality of connecting lines each of which includes pressure control device with a proportional valve also connected thereto, wherein each of said proportioning valves is connected to a single modulating valve for the purpose of being supplied with brake fluid under auxiliary pressure.

5. A braking system as set forth in claim 4 wherein said master cyliner is of the dual circuit type and wherein each of the wheel cylinders connected to one of said circuits is provided with individual pressure control devices and where the wheel cylinders connected to the other of said circuits are provided with a common pressure control device.

6. The braking system as set forth in claim 4 wherein said modulating valve includes a control chamber which is divided into two subchambers by means of a floating piston, the diameter of which corresponds to the diameter of the operating surface of said valve slide which faces said control chamber and wherein each of said chambers is communicating with each of the circuits of said master cylinder at any time.

7. A braking system as set forth in claim 6 wherein each of said pressure control devices is positioned in the immediate vicinity of said wheel cylinders.

8. A braking system having anti-skid control wherein a pressure control device is interposed in at least one line forming a connection between a master cylinder and at least one wheel cylinder, said pressure control device including a housing carrying a piston having operating surfaces which are acted on by the wheel cylinder pressure and by an auxiliary pressure from a pressure medium source through a modulating valve, said modulating valve being able to block a connection between the pressure medium source and the pressure control device and to open a return connection, said pressure control device also including a valve member therein operable by said piston which is capable of blocking said connection between said master cylinder and said wheel cylinder, including:
   a connecting line forming a connection between said pressure medium source and said modulating valve,
   said modulating valve being positioned in said connection between said pressure medium source and said pressure control device and including means for controlling the output pressure of the auxiliary pressure which may be obtained from said pressure medium source so as to correspond to the pressure in said master cylinder;
   said piston in said pressure control device being a stepped piston having first, second and third operating surfaces wherein said third operating surface is directly operated on by said auxiliary pressure from said modulating valve which is opposed by the master cylinder and wheel cylinder pressures acting respectively on said first and second operating surfaces, and having a valve passage formed in said piston capable of being opened by said valve member positioned in said piston after said connection to said master cylinder has been blocked, said valve passage forming a connecting passage leading from a chamber in said housing in front of said second operating surface wherein said stepped piston having larger and smaller diameter end portions and said first operating surface of said pressure control device at its end corresponds to the smaller diameter of said stepped piston, said second operating surface is formed by an annular surface of said stepped piston and wherein said valve passage is located through said stepped piston with said valve member being arranged to be axially movable within said valve passage and having a first blocking element formed thereon projecting to the exterior of said first operating surface and operable to block, said pressure medium connection to said pressure control device portion having an internal surface formed as a valve seat and being connected to said master cylinder, said valve passage having a valve seat portion for blocking said valve passage adapted to be blocked by a second blocking element formed as a portion of said valve member, and closing spring means for said valve member acting on said valve member in its closing direction.

9. A braking system having anti-skid control wherein a pressure control device is interposed in at least one line forming a connection between a master cylinder and at least one wheel cylinder, said pressure control device including a housing carrying a piston having operating surfaces which are acted on by the wheel cylinder pressure and by an auxiliary pressure from a pressure medium source through a modulating valve, said modulting valve being able to block a connection between the pressure medium source and the pressure control device and to open a return connection, said pressure control device also including a valve member therein operable by said piston which is capable of blocking said connection between said master cylinder and said wheel cylinder, including:

a connecting line forming a connection between said pressure medium source and said modulating valve, said modulating valve being positioned in said connection between said pressure medium source and said pressure control device and including means for controlling the output pressure of the auxiliary pressure which may be obtained from said pressure medium source so as to correspond to the pressure in said master cylinder;

said piston in said pressure control device being a stepped piston having first, second and third operating surfaces wherein said third operating surface is directly operated on by said auxiliary pressure from said modulating valve which is opposed by the master cylinder and wheel cylinder pressures acting respectively on said first and second operating surfaces, and having a valve passage formed in said piston capable of being opened by said valve member positioned in said piston after said connection to said master cylinder has been blocked, said valve passage forming a connecting passage leading from a chamber in said housing in front of said second operating surface, said stepped piston being positioned between a chamber formed in said pressure control device which connected with said wheel cylinder and said annular chamber which is connected with said valve including sealing collar means between said chamber and said housing of said pressure control device, said sealing collar means functioning as a check valve which is blocking in the direction of said annular chamber.

10. A braking system for a vehicle including an anti-skid control including:
a master cylinder of the dual circuit type;
a reservoir for brake fluid connected to said master cylinder;
wheel brake cylinders;
a pressure control device interposed in a line connecting said circuits of said master cylinder to said wheel brake cylinders;
a modulating valve;
an auxiliary source of brake fluid under pressure, connected to said reservoir, said modulating valve being interposed between said auxiliary pressure source and said pressure control device said modulating valve including means for blocking the connection between said auxiliary pressure source and said pressure control device and to open a return connection between said pressure control device and a return line to said reservoir;
an anti-skid signal controlled valve positioned in the connecting line between said modulating valve and said pressure control device including means to block the supply of fluid under pressure from said modulating valve to said pressure control device and to open a connection to the return line to said reservoir to effect anti-skid control;
said modulating valve including control chambers connected to each of the circuits of said master cylinder and a reaction chamber connected to either of said auxiliary pressure source and said return line to said reservoir depending upon whether auxiliary pressure is being supplied to said control device or whether said anti-skid controlled valve is returning fluid to said reservoir;
said pressure control device having a stepped piston positioned in the housing thereof having first, second and third operating surfaces, said first operating surface being acted on by fluid under pressure through a connection to said master cylinder into a first chamber which is in communication with one of said wheel brake cylinders, said first chamber including a valve seat formed internally thereof;
said second operating surface of said stepped piston defining with said housing a second chamber which is in communication with said modulating valve and said third operating surface of said stepped piston forming with said housing a third chamber which is supplied with brake fluid from said auxiliary pressure source through said modulating valve and said anti-skid controlled valve;
said stepped piston further including a fluid passageway formed therethrough which when open communicates fluid under pressure through said stepped piston from said third chamber to said first chamber and includes passageway blocking means operable to permit or block communication between said first and third chambers; and
sealing collar means positioned in said first chamber about said stepped piston acting to operate as a check valve.

* * * * *